United States Patent [19]
Telchuk et al.

[11] Patent Number: 6,027,566
[45] Date of Patent: Feb. 22, 2000

[54] PAINT SPRAY BOOTH

[75] Inventors: Steve E. Telchuk, Mundelein; John Allman, Lombard; George E. Allen, Jr., deceased, late of Carol Stream, all of Ill., by Kevin Allen, administrator, Kim Allen, administratrix

[73] Assignee: Blowtherm Canada, Inc., Barrie, Canada

[21] Appl. No.: 08/681,879

[22] Filed: Jul. 29, 1996

Related U.S. Application Data

[63] Continuation-in-part of application No. 08/201,210, Feb. 24, 1994, abandoned.

[51] Int. Cl.⁷ .............................. B05B 15/12; B01D 1/16
[52] U.S. Cl. .............................. 118/326; 454/55; 96/228
[58] Field of Search ...................... 118/326, 313, 118/600; 96/228, 229; 55/DIG. 46; 454/50, 55

[56] References Cited

U.S. PATENT DOCUMENTS

| | | |
|---|---|---|
| 888,119 | 5/1908 | Richards . |
| 1,054,589 | 2/1913 | Mestern . |
| 1,246,355 | 11/1917 | Thomas . |
| 1,966,280 | 7/1934 | Bingman . |
| 2,070,578 | 2/1937 | Bowman . |

(List continued on next page.)

FOREIGN PATENT DOCUMENTS

| | | | |
|---|---|---|---|
| 0089219 | 3/1982 | European Pat. Off. . | |
| 3122922 | 1/1931 | Germany . | |
| 115042 | 9/1975 | Germany . | |
| 142154 | 6/1980 | Germany . | |
| 2370733 | 5/1984 | Germany . | |
| 3447664 | 7/1985 | Germany | B05C 15/00 |
| 3408474 | 9/1985 | Germany | B05B 15/00 |
| 88 08 933 U | 8/1988 | Germany . | |

(List continued on next page.)

OTHER PUBLICATIONS

Binks Catalog "Waterwash & Disposable Filter Spray Booths" (Admitted prior art).
Binks Brochure "CentriClean" (Admitted Prior art).
Binks Brochure "BINKS Style E Dynaprecipitor" (Admitted prior art).
Bullows Brochure B3726 Wet Screen for Nopump Spray Booths (Admitted prior art).

(List continued on next page.)

*Primary Examiner*—David A. Simmons
*Assistant Examiner*—Calvin Padgett
*Attorney, Agent, or Firm*—Weingarten, Schurgin, Gagnebin & Hayes LLP

[57] ABSTRACT

A paint spray booth for painting an article and separating the spent paint overspray form the air and water used in the booth to collect the spent paint material is disclosed. The booth includes a water containing pan which has a deep portion and a shallow drain portion. The water used to separate the spent paint from the air and to clean the air discharged from the booth is collected on the drain portion and sent to the deep portion of the pan in a manner to cause a flow in the drain portion and deep portion of the pan to prevent accumulation of spent paint in undesired, inaccessible locations and to encourage movement of spent paint to desired, accessible locations in the pan and/or for removal or further treatment as by settling, skimming and/or separating, or the like, to provide the present invention with low maintenance similar to or less than other such booths, such as dry filter paint spray booths. The booth has a water manifold in its eliminator-washer section with a plurality of openings therein covered by a space "v" shaped cap which is easily cleaned and kept clean. The booth, preferably, has a spent paint intake pipe with a plurality of slots therein extending across and submerged below the surface of the tank to draw off the spent paint containing water, some of which is recirculated to the tank, some of which is recirculated in the washer section of the booth, and some of which is sent to be concentrated and remove the spent paint material.

31 Claims, 11 Drawing Sheets

U.S. PATENT DOCUMENTS

| | | | |
|---|---|---|---|
| 2,086,514 | 7/1937 | Saunders et al. | 91/68 |
| 2,127,908 | 8/1938 | Fischer . | |
| 2,132,826 | 4/1938 | Ludwig . | |
| 2,354,674 | 8/1944 | Fisher . | |
| 2,385,077 | 9/1945 | Harker et al. | 261/118 |
| 2,546,259 | 3/1951 | Fenn . | |
| 2,650,080 | 8/1953 | Harker et al. . | |
| 2,694,466 | 11/1954 | Bingman | 55/223 |
| 2,732,909 | 3/1956 | Campbell . | |
| 2,852,239 | 9/1958 | Vicard . | |
| 3,050,919 | 8/1962 | Tailor . | |
| 3,102,800 | 9/1963 | Bora . | |
| 3,138,087 | 6/1964 | Larsson et al. . | |
| 3,140,163 | 7/1964 | Hausberg . | |
| 3,182,977 | 5/1965 | Erni . | |
| 3,317,197 | 5/1967 | Lohner et al. . | |
| 3,385,030 | 5/1968 | Letvin . | |
| 3,391,630 | 7/1968 | Wilhelmsson | 98/115 |
| 3,700,389 | 10/1972 | Wanner et al. . | |
| 3,725,266 | 4/1973 | Haviland . | |
| 3,764,013 | 10/1973 | Eisenmann . | |
| 3,795,093 | 3/1974 | Gerhard et al. | 55/38 |
| 3,798,880 | 3/1974 | Arnold et al. . | |
| 3,803,997 | 4/1974 | Van Raden . | |
| 3,807,291 | 4/1974 | Roberts et al. . | |
| 3,876,399 | 4/1975 | Saponaro | 55/228 |
| 3,990,869 | 11/1976 | Forney . | |
| 3,994,808 | 11/1976 | Kearney . | |
| 4,045,524 | 8/1977 | Bornert . | |
| 4,067,806 | 1/1978 | Mauceri . | |
| 4,096,066 | 6/1978 | Kearney | 210/195 |
| 4,100,066 | 7/1978 | Bloomer et al. . | |
| 4,102,303 | 7/1978 | Cordier et al. . | |
| 4,157,281 | 6/1979 | Burkhardt et al. . | |
| 4,185,975 | 1/1980 | Scharf . | |
| 4,196,023 | 4/1980 | Rowe . | |
| 4,203,837 | 5/1980 | Hoge et al. . | |
| 4,220,078 | 9/1980 | Walker et al. . | |
| 4,222,319 | 9/1980 | Donahue . | |
| 4,239,512 | 12/1980 | Dobias | 55/90 |
| 4,241,646 | 12/1980 | Tsuruta et al. . | |
| 4,255,232 | 3/1981 | Ries . | |
| 4,285,270 | 8/1981 | Donahue | 98/115 SB |
| 4,294,191 | 10/1981 | Loof . | |
| 4,338,364 | 7/1982 | Kennon et al. . | |
| 4,399,742 | 8/1983 | Dobias | 98/115 |
| 4,425,870 | 1/1984 | Marshke | 118/326 |
| 4,440,647 | 4/1984 | Puchalski . | |
| 4,469,595 | 9/1984 | Napadow | 210/111 |
| 4,472,181 | 9/1984 | Herrlander | 55/228 |
| 4,484,513 | 11/1984 | Napadow . | |
| 4,515,072 | 5/1985 | Crisp . | |
| 4,567,818 | 2/1986 | Napadow . | |
| 4,585,557 | 4/1986 | Turnquist . | |
| 4,600,513 | 7/1986 | Mizutani et al. . | |
| 4,608,064 | 8/1986 | Napadow . | |
| 4,610,785 | 9/1986 | Russell | 210/195.1 |
| 4,629,477 | 12/1986 | Geke . | |
| 4,629,572 | 12/1986 | Leitz et al. . | |
| 4,661,527 | 4/1987 | Seng . | |
| 4,687,520 | 8/1987 | Seng . | |
| 4,696,254 | 9/1987 | Spindler | 118/610 |
| 4,701,220 | 10/1987 | Seng . | |
| 4,708,775 | 11/1987 | McGregor et al. . | |
| 4,722,791 | 2/1988 | Turnquist . | |
| 4,750,919 | 6/1988 | Patzelt et al. . | |
| 4,814,092 | 3/1989 | Patzelt . | |
| 4,815,397 | 3/1989 | Minnie, Jr. . | |
| 4,867,872 | 9/1989 | Russell et al. . | |
| 4,891,422 | 1/1990 | Waldmann . | |
| 4,925,563 | 5/1990 | Omori et al. . | |
| 4,957,633 | 9/1990 | Suutarinen . | |
| 4,980,030 | 12/1990 | Johnson et al. . | |
| 5,022,992 | 6/1991 | Looker . | |
| 5,062,963 | 11/1991 | Marcinkowski et al. | 210/712 |
| 5,105,393 | 4/1992 | Russell et al. . | |
| 5,160,628 | 11/1992 | Gerace et al. . | |
| 5,223,141 | 6/1993 | Brown et al. | 210/634 |
| 5,254,256 | 10/1993 | Zuerner et al. . | |
| 5,254,263 | 10/1993 | Gerace et al. . | |

FOREIGN PATENT DOCUMENTS

| | | | |
|---|---|---|---|
| 3739160 | 3/1989 | Germany . | |
| 438264 | 7/1991 | Germany . | |
| 1669505 | 8/1991 | Germany . | |
| 4212711 | 10/1993 | Germany . | |
| 53-99282 | 8/1978 | Japan . | |
| 56-70871 | 6/1981 | Japan . | |
| 56-70872 | 6/1981 | Japan . | |
| 57-136993 | 8/1982 | Japan . | |
| 58-291 | 1/1983 | Japan . | |
| 62-146700 | 6/1987 | Japan . | |
| 3-213190 | 9/1991 | Japan . | |
| 3-242283 | 10/1991 | Japan . | |
| 4-250894 | 7/1992 | Japan . | |
| 5670871 | 1/1993 | Japan | B05C 15/00 |
| 5670872 | 1/1993 | Japan | B05C 15/00 |
| 1009635 | 6/1957 | Netherlands . | |
| WO 91/00250 | 1/1991 | WIPO . | |

OTHER PUBLICATIONS

Penberthy Brochure "Penberthy is putting something new into electrocoat paint operations." (Admitted prior art).

Bullows Catalog "No Pump Spray Booth" (27 pages) (Admitted prior art).

Bullows Advertisement "Nopump the definitive waterwash booth" (2 pages) (Admitted prior art).

Binks Drawing #37459 for United Technologies—Sikorsky (Admitted Prior Art).

Binks Drawing #A39534 for The Maytag Co. (Admitted Prior Art).

Binks Drawing #25802 for Mitsubishi Catapillar Forklift (Admitted Prior Art).

Binks Drawing #808998 for Style "E" Dyna Booth (Admitted Prior Art).

PAINT SPRAY BOOTH

DISCLOSURE

This application is a continuation-in-part of U.S. application Ser. No. 08/201,210, filed on Feb. 24, 1994, now abandoned, entitled "Improved Paint Spray Booth", by Steve E. Telchuk, George Allen and John Allman and assigned to Binks Manufacturing Company.

This invention relates to paint spray booths having paint entraining washers therein with a plurality of paint entraining water sprays or falls with a water collecting pan therebeneath, and more particularly to paint spray booths of that type with improved construction that have high cleaning efficiencies and are easier to maintain and require less maintenance.

BACKGROUND OF THE INVENTION

The purpose of any paint spray booth is to evacuate the spent paint particulate and fumes from the point of paint application to an area where they may be removed from the air stream. In some instances this removal is for the benefit of the paint spraying operator, but is always beneficial to the painting process itself in that it is not desirable to have spent paint particulate re-deposited on the painted or to be painted surface. There have been acceptable standards established for air movement through the point of spray paint application. It is most desirable to maintain a constant approved air velocity whenever the paint spray booth is in operation. Unfortunately, in the case of present day dry filter spray booths, the air velocity through the point of paint application constantly diminishes as the dry filters continue to collect spent paint particulate. This diminishing performance may reach such a point of ineffective operation that the painting operation itself must cease until the clogged filters have been replaced with clean new filters. Additionally, there is a tendency to postpone the booth shutdown for filter replacement, thereby jeopardizing both the operator and finished product prior to shutdown. Further, as the filters begin to clog, their effectiveness because of increasing velocity through the ever diminishing unclogged filter area begins to pull particulate through the filter releasing it to the atmosphere. The booth down times to replace filters may have to be repeated anywhere from several hours to several days. The combined cost of production loss and replacement cost of filters becomes considerable.

In contrast, a water wash spray booth provides a constant non-diminishing air flow for a much longer period of time, consequently, having a high average performance during its operating cycle between shutdowns for sludge (accumulated spent paint) removal.

Paint spray booths have long used water as a means to wash out or entrain paint particulate or materials generated while spraying paint on an article being painted and into the surrounding air as overspray. In the water wash type booth a blower or fan is used to bring the surrounding air and paint overspray into a washer or eliminator section of the booth where this paint laddened air is cleaned or separated from the spent paint material, the latter eventually collection as sludge. Examples of this type of prior art booth may be found in Binks Manufacturing Company's U.S. Pat. No. 2,385,077. This type booth has long been used with acceptable results. However, increases in concerns as to air pollution, waste solids disposal and reductions in the amounts of materials which can be discharged both into the air and/or into solids disposal sites, makes improvements in this type of booth desirable so it can meet future air pollution and waste disposal requirements and to make them competitive and superior to dry filter booths.

The prior art water washed booths of this type usually had one or more water supply manifolds to generate in some cases a water curtain backstop to catch the overspray and one or more sheets of water spray to wash spent paint from the air in which it was entrained and also to keep the spent paint from building up on the interior structure, usually of sheetmetal, of the booth itself. In the prior art booths, as shown in U.S. Pat. No. 2,385,077, these prior water supply manifolds had a plurality of drilled holes spaced in rows extending the width of the booth or sometime had such holes tapped to receive small individual screwed in water nozzles. In U.S. Pat. No. 2,385,077 the prior art water manifold shown had the plurality of water sprays emanating from the row of holes covered by a concave curved cap, to generate a pair of opposed water spray sheets coming off the two or opposed edges of the cap. Alternatively, that patent also shows in FIG. 7 a water manifold having two rows of water spray holes generally about 180° apart each covered by a curved cap in an inverted, convex relationship to generate four spray sheets, instead of two, two off of the edges of each curved cap. However, because the two rows of holes were arranged in a manner about 180° apart, one at the top and the other at the bottom of the manifold, the water spray sheets apparently did not fully cover the surrounding sheetmetal of the booth by themselves, and a separate auxiliary water manifold was shown to provide additional covering water spray to prevent paint build up on the adjacent sheetmetal.

Other prior art booths of this type have used an angular, instead of a curved, cap over a single row of water nozzles as described above to generate two water sheets which generally fully cover the surrounding sheetmetal but generate less cleaning action than would the four water spray sheet forming structure. This type of prior art water manifold usually had water nozzles screwed into tapped holes in the pipe forming the manifold, and the holes in the manifold were covered by an angular cap, wherein the side edges of the angular cap were closer to the pipe (concave) than the center or juncture of its two angular sides. This construction had a tendency to plug or clog if the water being expelled from the nozzle was not relatively free of spent paint particulate. This plugging or clogging was usually due to spent paint materials being carried in the water from the water supply manifold which was sprayed out of the nozzles into the underside of the angular cap. While the clogging started usually on the underside of the angular cap, it would continue to build until it also plugged the nozzle. Due to the fact the nozzles' openings were covered by the cap and extended upwardly between the two angular sides of the cap, there was little or no room to clear away the clog. Thus, in many cases the clogging was ignored as it was difficult or impossible to clear, resulting in less efficient cleaning of the paint laddened air and build up of spent paint on the surrounding sheetmetal surfaces. Sometimes when clogging because severe and much of the length of the caps and or holes beneath them became clogged, the booth was just shut down and partially disassembled so that the manifold could be removed to be cleared, and then reinstalled. This procedure, of course, caused loss of operating time for the booth and increased maintenance expense, and less than maximum cleaning efficiency when the booth was operated with one or more clogged holes and or caps. It should be appreciated that when the holes or covering caps were clogged or had paint build up on them, the resulting water sheet sprays or falls off the caps may be imperfect and or have voids therein which would let more paint laddened air pass therethrough without being fully cleaned.

The prior art booths, such as shown in U.S. Pat. No. 2,385,077, also generally had a deep (one foot or so) water pan beneath the entire booth into which the water from a front water curtain and water manifold sheet sprays eventually collected. This front water curtain and sheet sprays water had spent paint particulate entrained therein, which was removed from the air flowing past the article being painted then collected by the water flowing in the booth. As the water from the curtain and water sheets carrying the entrained paint collected in the generally stagnant water pan, the entrained material tended to drop out or collect in the pan. If the entrained paint material was heavier than water, as was frequently the case, this spent paint settled into the bottom of the pan. If initially this entrained material was lighter, first it floated on the water in the pan and then agglomerated into heavier particles and eventually sank. This settling action was thought desired for booth operation. When sufficient settling occurred so that it seriously adversely affected painting operation, or just periodically, the booth was shut down and the settled spent paint material was usually hand shoveled out. Thus booth operating time was lost; there was difficult and bothersome hand labor and increased maintenance expense. Generally, in the past a heavily used booth of this type might have to be cleaned as frequently as twice a week and cleaning could take as long as eight hours or more. Further, as the pan extended under the entire booth, much of the spent paint collected in places under the booth that were very difficult to clean. Further, the difficulty in cleaning resulted in increased spent paint being carried out of the pan into the air washer means, water supply manifold, outlets and/or nozzles, resulting in the same and/or their covering caps being partially or fully clogged as discussed above.

SUMMARY OF THE INVENTION

The paint spray booth of the present invention is generally similar to the prior art booth disclosed in U.S. Pat. No. 2,385,077 but portions of the washer section (such as the water manifold, spray holes, caps covering the same), collecting water pan, and spent paint intake system (manifold or pipe with slots) thereon being now provided, and other portions thereof are greatly improved to give better cleaning and lower maintenance. With the present invention intervals of operation between booth cleanings can be extended for much longer times measured in months, and cleaning times can be greatly reduced to one half or less time, to say four hours or less.

The water supply manifolding of the booth of the present invention is improved to the extent that the manifold is made of PVC pipe which is lighter in weight and easier to both machine and handle, during manufacture, installation and maintenance. The booth of the present invention has each water spray hole or outlet formed or drilled in the manifold to form a tapered sharp edge orifice to provide an improved and more uniform water spray pattern fall and/or curtain, and is a result a more uniform air washing water sheet.

The booth of the present invention also has an improved water spray arrangement using two rows each of a plurality of water spray outlets or holes, formed as described in the paragraph above but with both rows located in the upper half of the manifold and spaced apart say from 30° to 150°, with each row of holes being capped by its own angled member that is inverted (by analogy convex) so that the intersection of the two angular sides is closest to the row of outlets it covers, instead of the heretofore ends of the angular sides being closest to the row of outlets it covered (by analogy concave). Thus with the improved construction, four water spray sheets are generated in a manner to fully cover the surrounding sheetmetal without the need for any auxiliary water supply manifold to cover missed areas or spots. Thus, the enhanced cleaning effect of four water spray sheets is achieved, without the need for an auxiliary water manifold, and in a manner that the water outlets or holes are less likely to clog, and even if they do clog, can be easily cleared externally simply by poking a tool, wire or the like into the outlet, since its easily accessible, without the need to disassembly the booth and/or to remove the water supply manifold to do so.

In the booth of the present invention the improved water supply manifold and covering caps are used with an improved water pan therebeneath which limits the amount of water in the system, reducing the amount and cost of chemicals needed to condition the water and the amount of booth structure needed to support its weight. The water pan is also designed to keep the spent paint material entrained in the water as the water flows at a fast enough speed, say one foot/per second, and in a range of 0.5 to 3 feet/per second, to prevent settling until that water reaches a preferred, convenient location, i.e., accessible for eventual removal. If need be means in the form of flow inducers can be provided to maintain and/or direct the water flow in the pan to achieve the desired speed. Thus, the disadvantages of having the paint settle in portions of the pan that are difficult to clean are avoided. Additionally, the pan may be fitted with means for removing the entrained paint, such as a settling volume or basin when the paint is heavier than water, a skimmer when the paint is lighter than water, a separator for removing spent paint material, a weir, and/or any combination of one, two or more of these features.

In the booth of the present invention, preferably, the pan under portions of the booth that are inaccessible, is very shallow and in the form of a drain flow sheet or sluice elevated at some portions to encourage flow toward other or lower portions of the drain sheet or sluice. The water flows from the drain sheet and the lower portion of the sluice into a deeper depth portion of the pan. At least a part of this deeper portion (the settling volume) of the pan is located at a convenient accessible location to clean, such as at the front, side or rear of the booth. Thus, the entrained material in the water can be concentrated and settled in a location where it can be more easily removed. Further, in the pan, even in the deeper portions, a flow can be encouraged to move the entrained material to a desired location such as over the weir to provide clean water to a pump supplying the water manifold, to the skimmer to remove floating material, or to the entrance of a mechanical separator, such as Model No. C80M (29-201) sold by Binks Manufacturing Company. In its basic forms this flow in the pan can be provided by just the water return from the drain sheet/sluice through the duct containing the sluice to the pan. If desired, where there is an excess of water under pressure returned from the water supply manifold, that can be used to induce a larger general flow of water in the deep pan. To achieve such a larger flow, the excess flow from the manifold can be sent to inducers (enductor) such as made by Penberthy of Prophetstown, Ill.), located where desired, to achieve the flow desired. There is a further advantage that a continuous water flow is provided through the water supply manifold from one end to the other to purge it of spent paint material. In the skimmer and/or separator the paint solids which were first concentrated in the booth and in the pan, are removed from the water and the cleaned water returned to the booth pan to resupply the water supply manifold for use in washer means and/or the water spray sheets and water curtain.

While the skimmer described in the parent application worked well, it has been discovered that a spent paint intake system, comprising a manifold or pipe say from 4" to 15" in diameter (generally depending on tank or pan size) placed below the surface of the tank or pan works even better. The intake pipe extends lengthwise across the width of the tank, generally perpendicular to the flow in the tank. The intake pipe is provided with opening means in the form of one or more slots along the length into which the spent paint carrying liquid may be drawn to concentrate the same. The spent paint from the pipe is discharged into a pump intake tank from which it can be recirculated in the washer section of the booth. Some of the spent paint carrying liquid can also be drawn off after it has been collected by the intake pipe to provide flow via a plurality of inducers in the booth's tank. Another smaller portion can be sent to a concentration or separator, such as the CentriClean sold by Binks Manufacturing Company.

With the revised spent paint intake system, it is not necessary to fully "float" the paint as it works well with spent paint that would float, sink or is generally of similar buoyancy of the liquid in the tank. By spacing the slots along the pipe, generally dead spots which might encourage accumulation of spent paint, are avoided. The slots preferably are in the upper part of the pipe. Of course, these slots could be of variable or adjustable size (such as covered by a slidable member) and are of a minimum dimension (say ¾ of an inch) to prevent being clogged with sent paint agglomerates. This cleaned recirculated water is generally free of paint solids which heretofore tended to clog the manifold holes or nozzles and covering caps and resulted in less efficient cleaning. Thus, just the removal of spent paint from the water used in the washers results in better cleaning. Thus the booth of the present invention results in higher cleaning efficiencies, less clogging and a more maintenance free operation.

The present invention, which consolidates spent paint drawn off by the skimmer or, preferably, the submerged spent paint intake pipe, facilitates extraction by separator means, such as the above mentioned Binks mechanical separator, allows the water washed booth of the present invention to perform effectively for longer periods of time.

Additionally, the booth of the present invention provides a close to maintenance free spray booth with practically no down time. Further, the disposal requirements of the paint laden filters from dry filter booths is at least double that of separated, compacted paint sludge of the booth of the present invention. When considering present and possible future landfill restrictions, the advantages of the booth of the present invention becomes very apparent. Still additionally, there may be an opportunity to reclaim and process the compacted paint sludge for reuse and/or other purposes.

It is an object of the present invention to provide a paint spray booth with cleaner operation.

It is another object of the present invention is to provide a paint spray booth which requires less maintenance.

Yet, another object of the present invention is to provide a booth which is less likely to become plugged or clogged with spent paint material.

A further object of the present invention is to provide a paint spray booth which has but a single water supply manifold which provides coverage of the adjacent sheet-metal and enhanced cleaning action.

A still further object of the present invention is to provide a paint spray booth which has a water pan which requires less maintenance.

An additional object of the present invention is to provide a low maintenance booth having a shallow drain sheet which can be used with various washer sections.

A yet further object of the present invention is to provide a paint spray booth with a water pan which has shallow portions beneath inaccessible locations which prevent accumulation and deeper portions in an accessible location wherein further treatment, such as one or more of settling, skimming or separation may be provided.

Yet a further object of the present invention is to provide a pan which facilitates water flow to cause consolidation and removal of spent paint material prior to reuse of the water in the booth.

Still a further object is to provide an intake system submerged below the surface of the tank for removing spent paint.

Yet another object is to provide a submerged intake system for removing all the water from the tank while returning some water to the booths washer and removing spent paint.

These and other objects of the present invention will become apparent from the following text and accompanying figures of the drawings.

DESCRIPTION OF THE PREFERRED EMBODIMENTS

Figure 1:
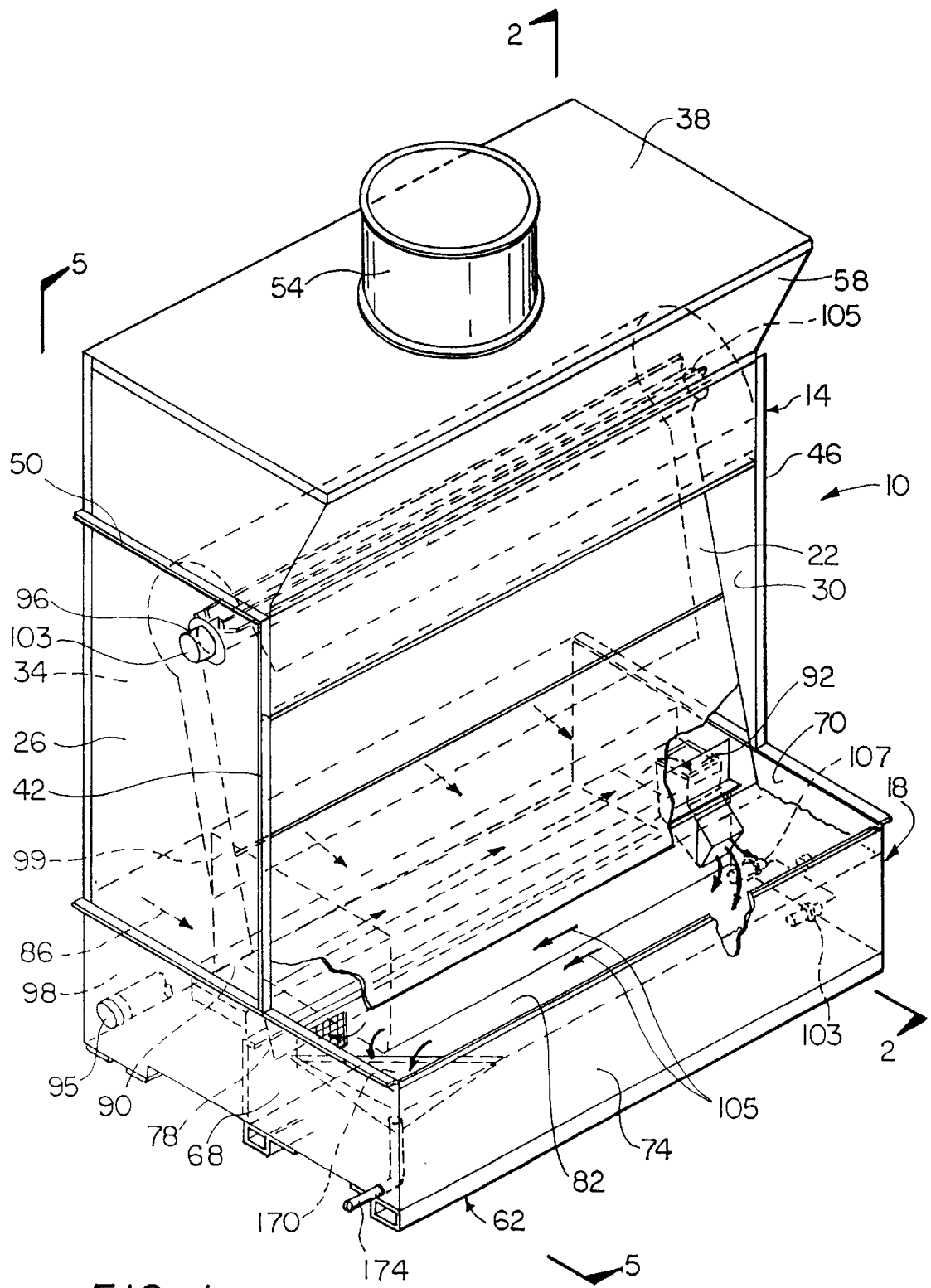
FIG. 1 is a perspective view of a first embodiment of the paint spray booth of the present invention, with one type washer means and portions thereof broken away.

By way of background the paint spray booth of the present invention can be made in an overall or general style similar to prior art booths, such as that shown in U.S. Pat. No. 2,385,077. Referring to FIG. 1 of this application, the paint spray booth 10 of the present invention comprises an upper structure 14, preferably of sheetmetal, and a lower structure 18, also preferably of sheetmetal. The upper structure 14, in this instance, has a water curtain which falls down the front of a nearly vertical but slightly forwardly and downwardly inclined sheetmetal wall 22 that forms a backstop for the paint being sprayed onto an article, such as indicated at 23 (FIG. 2), being painted in the front of the booth. The wall 22 is covered by the water curtain as is illustrated and will be described. As is shown in FIG. 1, the water curtain wall 22 is carried and/or supported by two side walls 26 and 30 at opposite ends of the booth which determine the width of the booth. It should be understood that the booth could be built in various and/or desired widths, say of from 3 feet to 100 feet or more and of heights from say 5 to 50 feet or more. The two side walls 26 and 30 are joined at the rear by a back wall 34 and at the upper ends by a top wall 38. Where desired the structure of the booth can be additionally reinforced and/or supported as by various structural or angle members such as 42, 46 and 50. The top of the booth is provided with an exhaust duct 54 which can contain therein or be connected to an external fan or blower (not shown) to withdraw air from the booth. The upper front of the booth is closed to the sides 26 and 30 and the top 38, by an upper front wall 58. The foregoing completes a general overall description of the upper exterior structure of booth 10.

Figure 6:
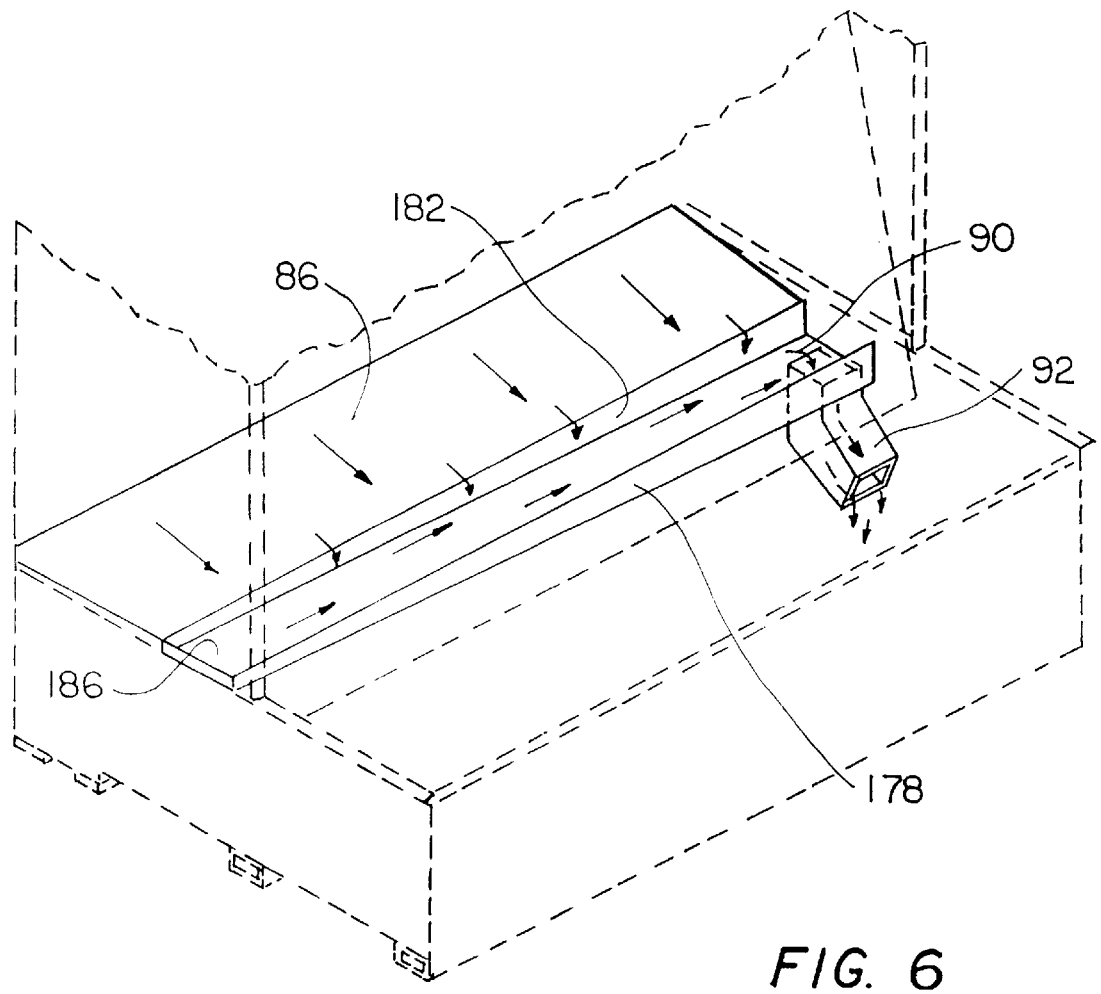
FIG. 6 is a perspective view of the lower pan portion of the first embodiment of paint spray booth of the present invention showing parts in phantom so as to better illustrate the drain sheet and sluice at the back thereof.

The lower structure of booth 10, generally comprises a water collecting/containing pan 62. This pan is formed by the two lower pan side walls 66 and 70, the front pan side wall 74, and a pan back side wall, if the latter is desired for structural reasons. The pan itself has an accessible deep depth tank section or portion, in this instance at the front of the booth, and a shallow depth, drain sheet and sluice portions, in this instance behind. The water containing deep tank portion is formed between the forward portions of two lower pan side walls 68 and 70, the front pan wall 74, at the rear an intermediate pan wall 78, and the bottom pan wall 82. The shallow portion is simply provided by a forwardly and slightly downwardly inclined from horizontal drain sheet section 86 and the adjacent collection channel or sluice section 90, which collects the water flowing from the rear, upper structure of the booth and directs it via a connecting duct 92 into the deep depth front tank portion of the pan as shown by the arrows in FIGS. 1 and 6.

Further details of the booth of the present invention will be described with reference to FIG. 2. The water curtain sheet 22 has at the top thereof a water supply pipe or manifold 96 which carries water to supply the curtain of water flowing down sheet 22. In addition to supplying water to the curtain 22, the manifold 96 supplies water to the washer means or section of the booth which washes the entrained paint material out of the air carrying the paint overspray. This manifold 96 is carried or supported by the booth's side wails 26 and 30. The manifold at one end 97 can be connected to a pump (see FIG. 7) which in turn draws water from the tank outlet 95 of a pick up tank 98 in the left rear segment of the deep tank portion of the pan 62, closed off by the back partition 99, extending between the walls 34 and 78. The tank outlet 95 can be fed by a pipe extending into the pick up tank 98 and has a series of elongated inlet slots therein. The tank outlet 95 of course leads to the pump. A screened, removable access opening 93 can be provided in the intermediate panel 78 for keeping out materials and for access for maintenance.

Figure 3:
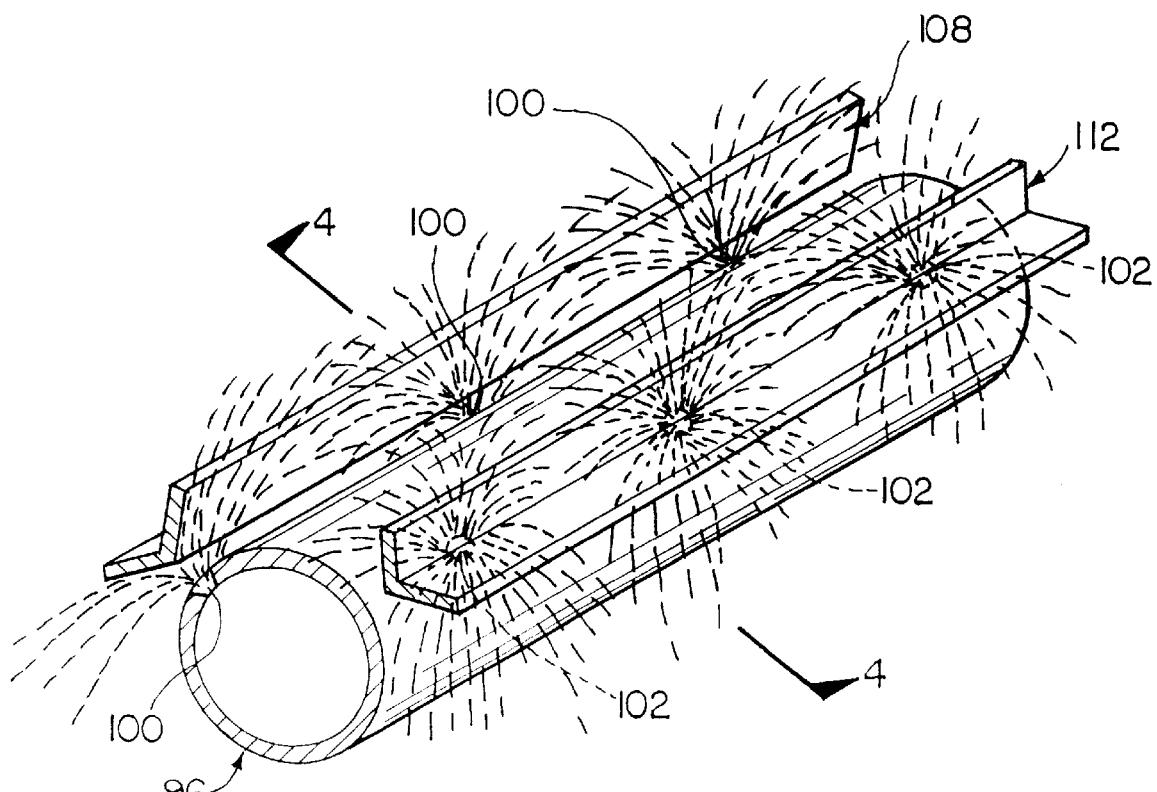
FIG. 3 is an enlarged perspective view of the water supply manifold portion of the paint spray booth of the present invention shown in FIG. 1.
Figure 4:
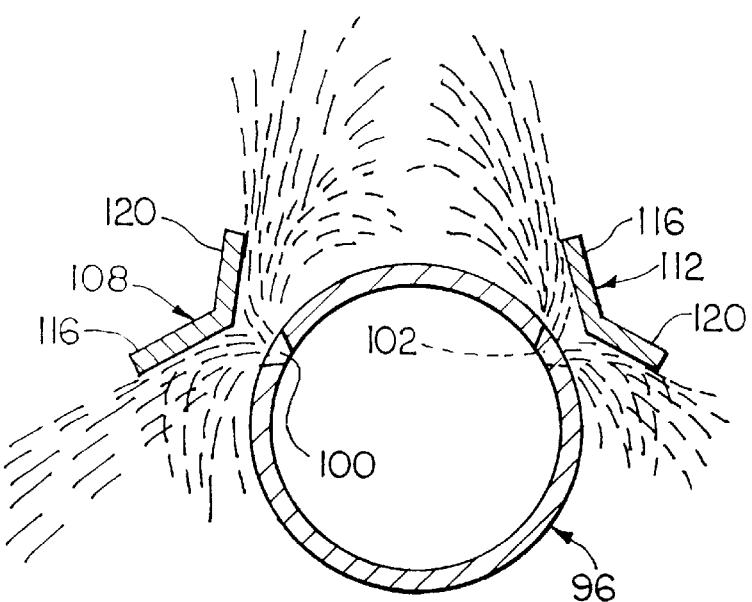
FIG. 4 is a cross-sectional view taken on the line 4—4 of FIG. 3.

As is more clearly shown in FIGS. 3 and 4, the manifold 96 is made of, preferably, PVC pipe (say of three to six inches in diameter for booths up to 20 feet in width, and in this instance of four inch diameter –80 schedule PVC) and has water spray outlets drilled or formed therein to form radially expanding tapered, non-clogging sharp edged orifices or outlets 100 or 102. These outlets 100 or 102 are say $^{23}/_{64}$ of an inch diameter at the manifold interior, tapering to a larger ¾ inch diameter at the manifold exterior. Of course, other size outlets could also be used. These outlets 100 or 102 are arranged in two sets or rows (identified by 100 or 102) spaced say 1 to 8 inches apart, and for the size outlet described above, they are, preferably, spaced about 6 inches apart. The outlets of the two rows 100 and 102 are staggered so as to provide a more uniform water flow. The left end of the manifold 103 is supplied with water from the tank 98 by the pump. The other end 105 of the manifold is connected to return excess water to the pan 62 and in addition thereto to a pair of inducers or enductors 107 therein to cause a water flow from that right end of the pan towards the other or left end as is indicated by the arrows 105 and shown in FIG. 1. This continuous flow through the manifold 96 from end 103 to end 105 also keeps that manifold 96 purged of paint agglomerations that might otherwise clog the outlets.

In this instance the air washer section or means is in the form of an air passage means 132 which is washed numerous times with the water flow from the manifold 96. Above each of the rows 100 or 102, a V-shaped cap means 108 or 112 is provided. Each V-shaped cap has extended arms 116 and 120 which are about 120° apart, each side being at an angle of about 30° from a tangent to the manifold. In this instance the outlets 100 and 102 and V-shaped arms 116 and 120 are symmetrically arranged about the manifold so that the outlets 100 and 102 are about on the same horizontal level. Of course these positions could be altered somewhat.

Figure 2:
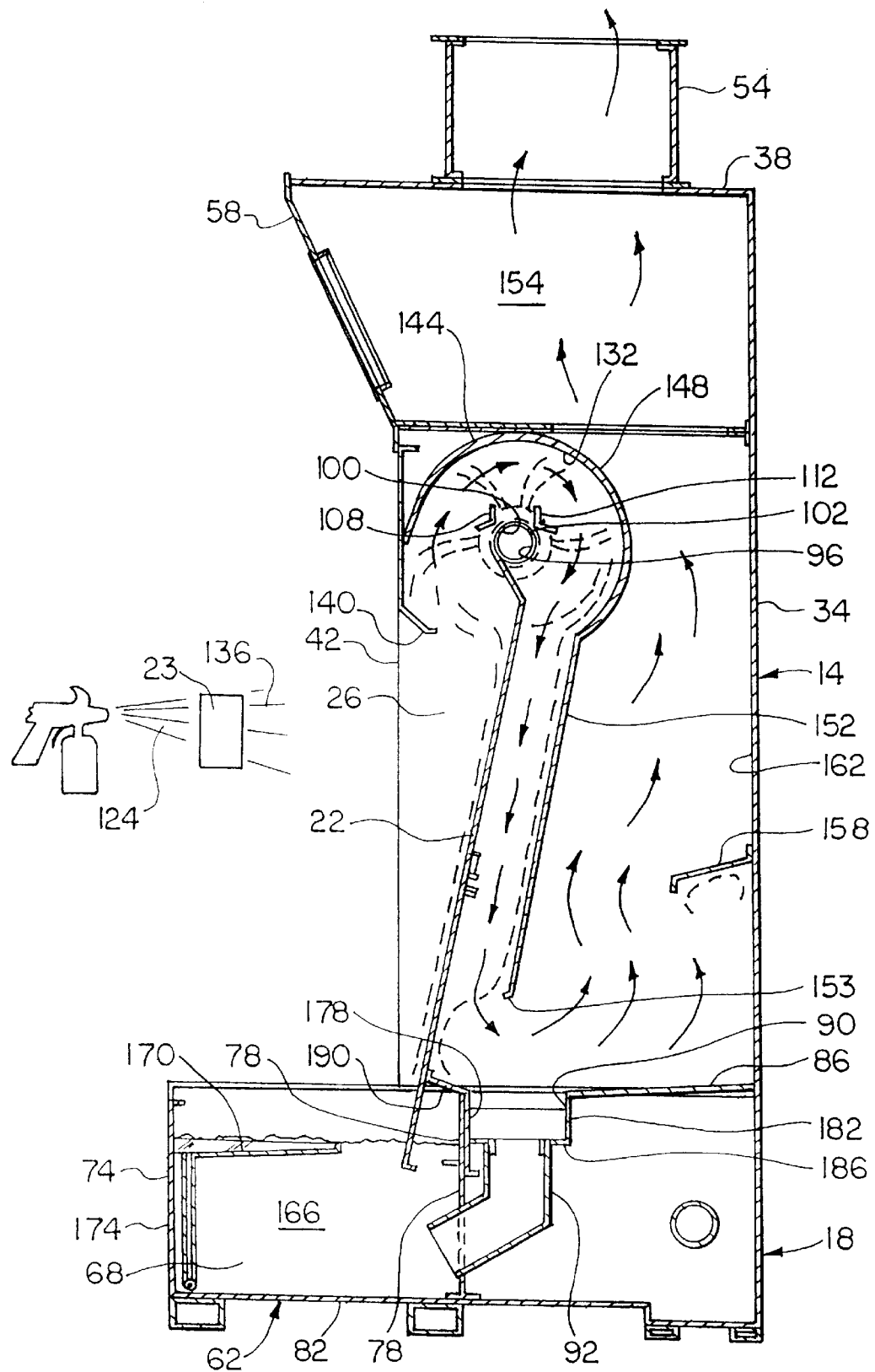
FIG. 2 is a cross sectional view of the paint spray booth of the present invention taken on the line 2—2 of FIG. 1.

As shown in FIG. 2, in front of the sheetmetal 22 forming the water curtain section is the area wherein the spray painting indicated at 124 takes place with the paint spray being directed at the article 23, being painted and the water curtain section 22 therebehind.

Air passage means 132 is provided to collect the spent paint or overspray 136 which does not impact in and/or is not collected by the water curtain 22. This air passage means 132 has an opening at the top of the water curtain sheet 22 and generally curves at a spaced distance around the water supply manifold 96. As shown in FIG. 2, the lower edge of the front wall 58 is bent inward toward the sheet 22 to form an entrance flange 140. In this instance a curved baffle 144 having a front portion and a rear portion 148 is provided spaced from but generally curving around the water supply manifold. While the rear or right side (as shown in FIG. 2) of the curved baffle 148 is necessary, the front left side 144 (as shown in FIG. 2) is believed preferable, but could be omitted. It is believed that as there are two water sprays at the top, there would be sufficient coverage of the adjacent sheetmetal with water without the need for any auxiliary water manifold. Beneath the curved baffle 148 a further, nearly vertical (forwardly and downwardly inclined) sheet-metal sheet 152 provides an additional water curtain. Thus the air passage means 132 is defined by the top portion of the front side of sheet 22, the water supply manifold 96 and the back side of sheet 22 on one side, and the flange 140, a portion of the front wall 58, the curved baffle 144 and 148 and the front side of the further second sheet 152 on the other side.

The air passage 132 at its downstream, lower end leads into a water eliminator section 162. The water elimination section 162 is formed between the side walls 26 and 30 and between the back side of the further sheet 152 and the back wall 34 of the booth, opening up to the top plenum 154 and into the exhaust duct 54. To help prevent water from leaving out the duct 54, one or more water elimination baffles, as is conventional, such as baffle 158, can be provided. The foregoing generally completes the overall description of the upper structure of the first embodiment of paint spray booth of the present invention.

Turning now to the lower structure of the first embodiment booth of the present invention. As previously described the forward portion of the pan 62 is deep and forms the water containing tank or pan 166 which includes the pick up tank 98 previously described. The portion 166 of the pan 62 can be provided, if desired, with a skimmer 170 which can be drained by a hose 174, extending in a sealed manner through, for example, the side wall 68 and connected to the mechanical separator. See FIG. 7. As is shown in FIG. 2, this deep pan 166 can be supplied with water from the upper structure of the booth by the water curtain 22 and through the duct 92. The duct 92 is located at one end of an inclined open channel or sluice 90. The sluice 90 is formed by two side walls 178 and 182 and a bottom wall 186, the latter being inclined to cause water to drain into the duct 92 at the lower end. Any water coming out of the lower upstream end of air passage means 132 travels over an inclined closure strip 190, which prevents air passage from the front to back, into the sluice 90. Alternatively, the sluice could have been widened so that the lower sheet from the front water curtain would extend below the water in the wider sluice to form an air lock. On the opposite side water drains downwardly from say the left end, as shown in FIG. 1, of the eliminator section onto the drain sheet 86, which in turn also drains into the sluice 90. All the water that is collected in the sluice 90 travels though the duct 92 into the deep tank portion 166 of the pan 62 to cause a flow therein. If the booth is of a wide width, a plurality of sluices, like 90, each with its own discharge duct, like 92, could be provided along the width of the booth, say every 5 to 15 feet, and preferably at every 10 feet.

Now that the structure of the first embodiment booth of the present invention has been described, its operation will now be described. As is shown in FIG. 2, as the article 23 is painted, overspray of spent paint material 136 not applied to the article, impacts against the water curtain flowing down the front (left side in FIG. 2) of sheet 22; falls down into the surface of the water in the pan 166, or is drawn up into the opening of the air passage means 132 between the flange 140 and water curtain sheet 22. Now at the same time water is being supplied under pressure (at say 10 psi—with a range of say 6 to 12 psi) to one end 103 (the left in FIG. 1) of the water supply manifold 96 by a pump from the pick up portion of the pan 166. See FIG. 7. This water flows out the outlets 100 and 102, against the deflector strips, in this instance in the form of V-shaped caps 108 and 112, to form four sheets of water in and across the air passage means 132. In order to achieve this flow out the outlets 100 and 102 the manifold flow downstream thereof is choked down to say 2 inches diameter for a 4 inch diameter manifold pipe. It should be understood that while the V-shape is preferred, other deflector strip shapes could be used. The water from two of the sheets off of the first V-shaped cap flows in a direction counter to that of the direction air flow in passage 132, to the curved baffle 144, down off the entrance flange 140, again across the air passage means 132, forming a fifth washing sheet, down onto the sheet 22, and from there back into the pan 166. The water emanating off the second V-shaped cap 112 forms two air washing sheets moving in a direction with the direction of the air flow in passage 132 crossing the same and collects on the curved baffle 148. Some water flows across the air passage 132 again at the juncture of the lower end of curved baffle 148 and sheet 152 to the backside of the sheet 22 to wet the same and prevent paint accumulation. This flow also provides some additional washing action. Most and the remainder of this water flows down the sheet 152, wetting the same to likewise prevent accumulation. The water that flows down the sheet 152 again due to the bent lower flange 153 crosses the air passage to further wash the air flowing therethrough of spent paint.

Further, as the water flows off the ends of the V-shaped caps 108 and 112, the action of the fast moving air (say 800 feet/min to 1,250 feet/min in velocity) pulled by the fan or blower, particularly when the water is flowing in a counter direction, causes a shearing action on the water causing it to break up into fine drops to better and more fully wet the spent paint with water and to cause the latter to agglomerate and be cleaned out of the air. In order to provide good results the water flow from the Vs 108 and 112 is such that about 25% goes to the front to help form the water curtain on sheet 22 and 75% goes to the rear or downstream toward the elimination section. For a booth of about an 8 to 10 foot width, the manifold end 103 would receive say 240 gallons per minute flow, with 190 or more gpm going to the air washer and 6 to 10 gpm going to the water curtain, and 40–60 gpm being returned from end 105 back to the pan 62. The pump should be sized to handle the chosen booth width. If the booth is say 60 feet wide, one might want to use a separate pump for each 20 feet thereof.

As the air turns upward into the elimination section the wetted paint particles continue downwardly and impact into the sluice 90 and onto the drain sheet 86 to be collected by the water flow there in and there across. As the water drops out of the slowed air moving upwardly in the eliminator section, some of this water collects on the drain sheet 86 and then flows into the sluice 90 and the duct 92 to return to the deep tank portion 166 of the pan.

The water flowing in the water curtain sheet 22, in the air passage means 132, and in the eliminator section generally prevent paint accumulation thereon while washing the overspray paint materials out of the air, which air can be discharged in an essentially clean manner out the duct 54. As this water collects in the booth either in the water curtain or sheet 22 or on the drain sheet 86, in the sluice 90 and duct 92, it is returned to the deep or tank portion 166 of the pan carrying with it the previously collected spent paint materials. Upon being discharged from the duct 92 into the tank 166, the water and carried paint materials come under the influence of the flow induced by the duct 92 and, if present, inducers 107 to move from the right side to the left side of FIG. 1 and indicated by the arrows 105. In the present instance the inducers 107 receive say 10 gpm and induces an additional flow of say 40 gpm. From there the skimmer 170 removes any floating materials to further concentrate the spent material. This water could be sent to a separator (See FIG. 7) wherein the spent paint material is still further concentrated to nearly solid state, and the cleaned water returned to the left side or pick up tank section 98 of the tank 166 to be resupplied to the water supply manifold 96 to start another cycle. Any spent paint material not collected by the skimmer 170 and/or the separator would eventually settle in the front tank 166, wherein it could be more easily cleaned, say by the use of an auxiliary vacuum connected to the pump inlet, than in the prior art booths.

If desired a weir could be provided in the tank 166 say at the mid point between the walls 68 and 70 extending between wall 74 to 78 with the water on the right side at just above the level of the weir and that on the left side lower to permit flow of water over the weir. Then any settling material would concentrate on the right (heavy material) or left (floating material) side of the weir, depending upon the desires and material to be concentrated. The weir could be say of a height extending from the bottom 82 to say a few inches below the top of the walls 68, 70, 74 and 78. With such construction the heavy spent paint could settle in the right side of the tank 166 while cleaner water would pass over the weir to the left side wherein it could be supplied to the water supply manifold and/or still further treated by the separator.

By way of example to attest to the nature of the improvement in operation possible with the booth of the present invention, an experimental test section was tested at Binks Manufacturing Company. Seven gallons of water reducible enamel was sprayed into the test booth, without paint being applied to any articles, in 36 minutes, and during this 36 minute period 45% of the paint solids was recovered by the separator. The test demonstrates the ability of the booth to keep itself clean and to permit long operation with much less maintenance than was necessary with a prior art booth.

Figure 7:
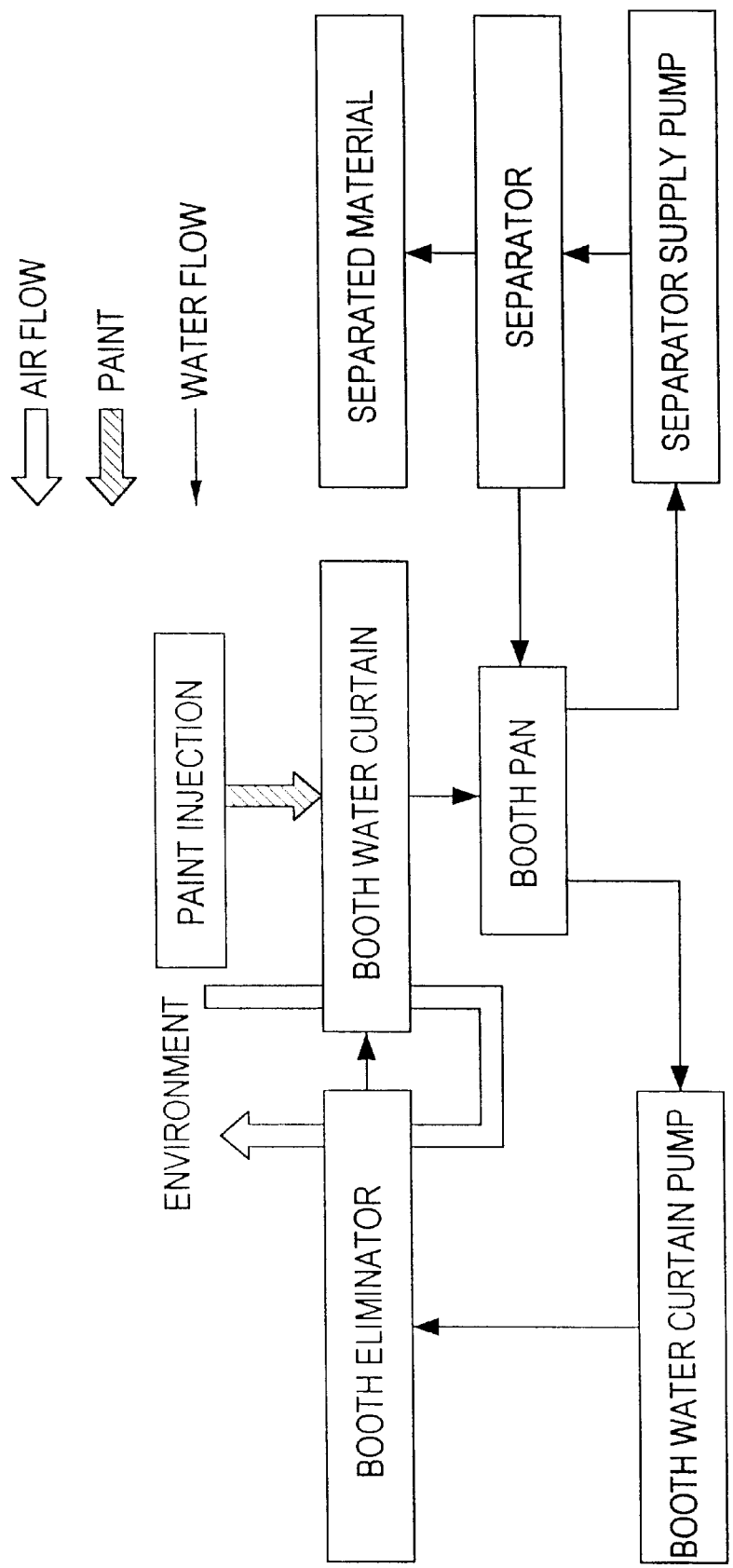
FIG. 7 is a schematic diagram showing the components of the first embodiment of paint spray booth of the present invention with the direction of paint, air and water flow being indicated by arrows.

A schematic view of the operation of the first embodiment spray booth of the present invention is shown in FIG. 7. The various components are labeled, and the respective air flows, water flows and paint spraying or injection are shown by designated arrows, the arrow for air flow is outlined (⇐); the arrow for paint spray is cross hatched (⬅); and the arrow for water flow is solid (←). The schematic shows the clean air is mixed with the paint; the paint and air are then treated with water to clean the air; the air then is returned to the environment from which it was taken in about as clean a state as it was originally. The water too is shown being treated, concentrating and removing the spent paint it claimed from the air, and the spent paint concentrated to nearly a solid like state.

Figure 5:
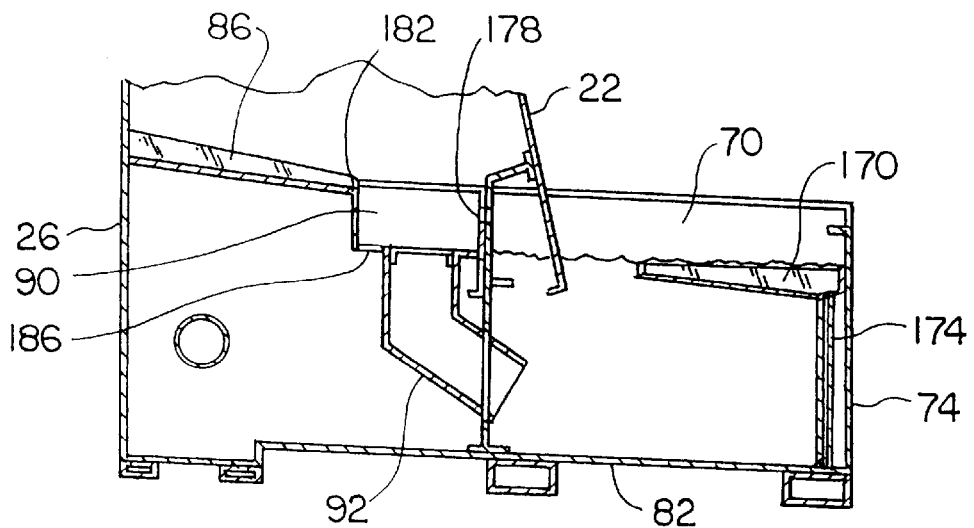
FIG. 5 is a partial sectional view of the lower, water pan, portion of the paint spray booth of the present invention taken on the line of 5—5 of FIG. 1 with the upper structure of the booth omitted for clarity.
Figure 8:
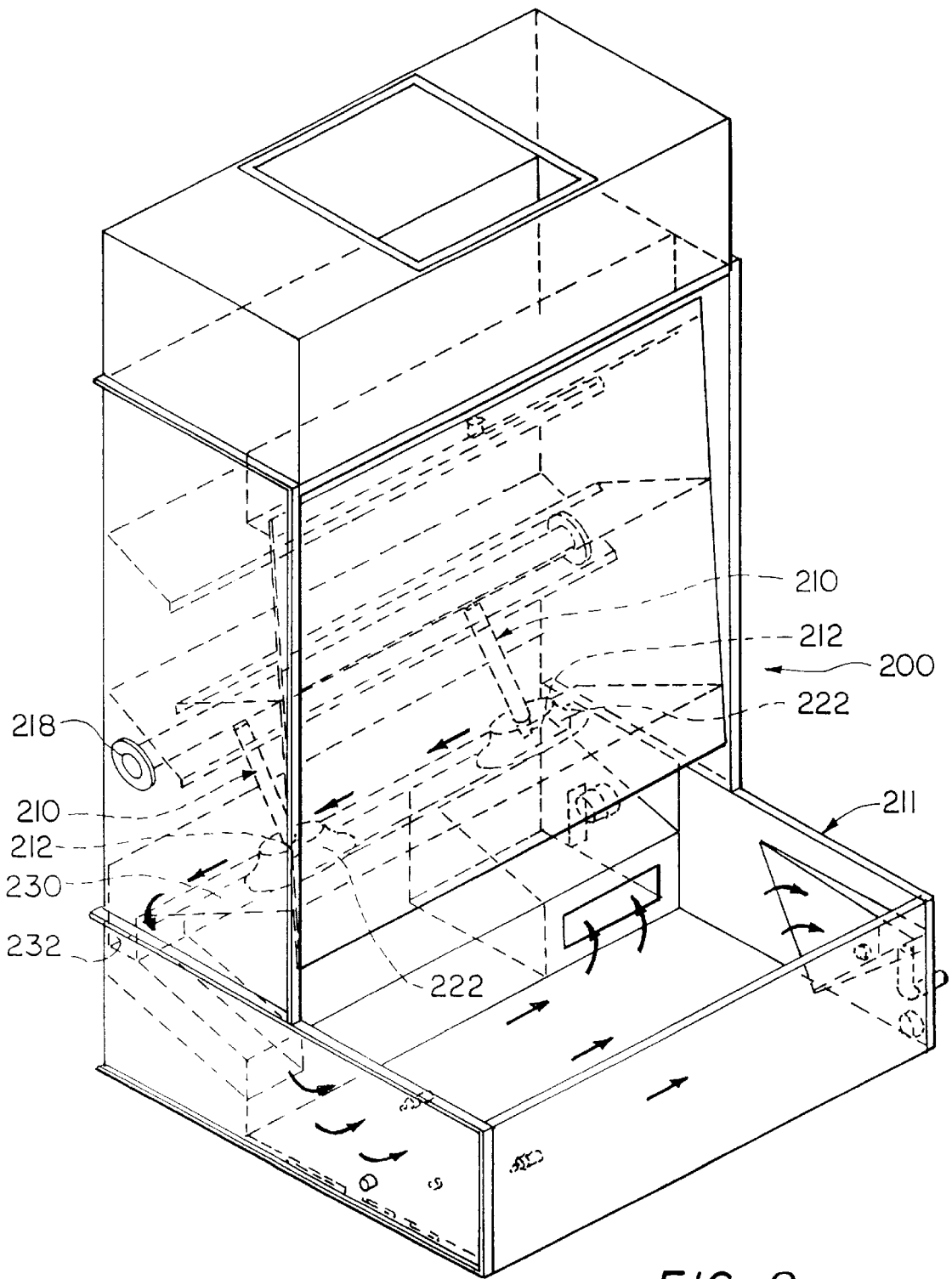
FIG. 8 is a view similar to FIG. 1, but of a second embodiment paint spray booth of the present invention with another type washer means.
Figure 9:
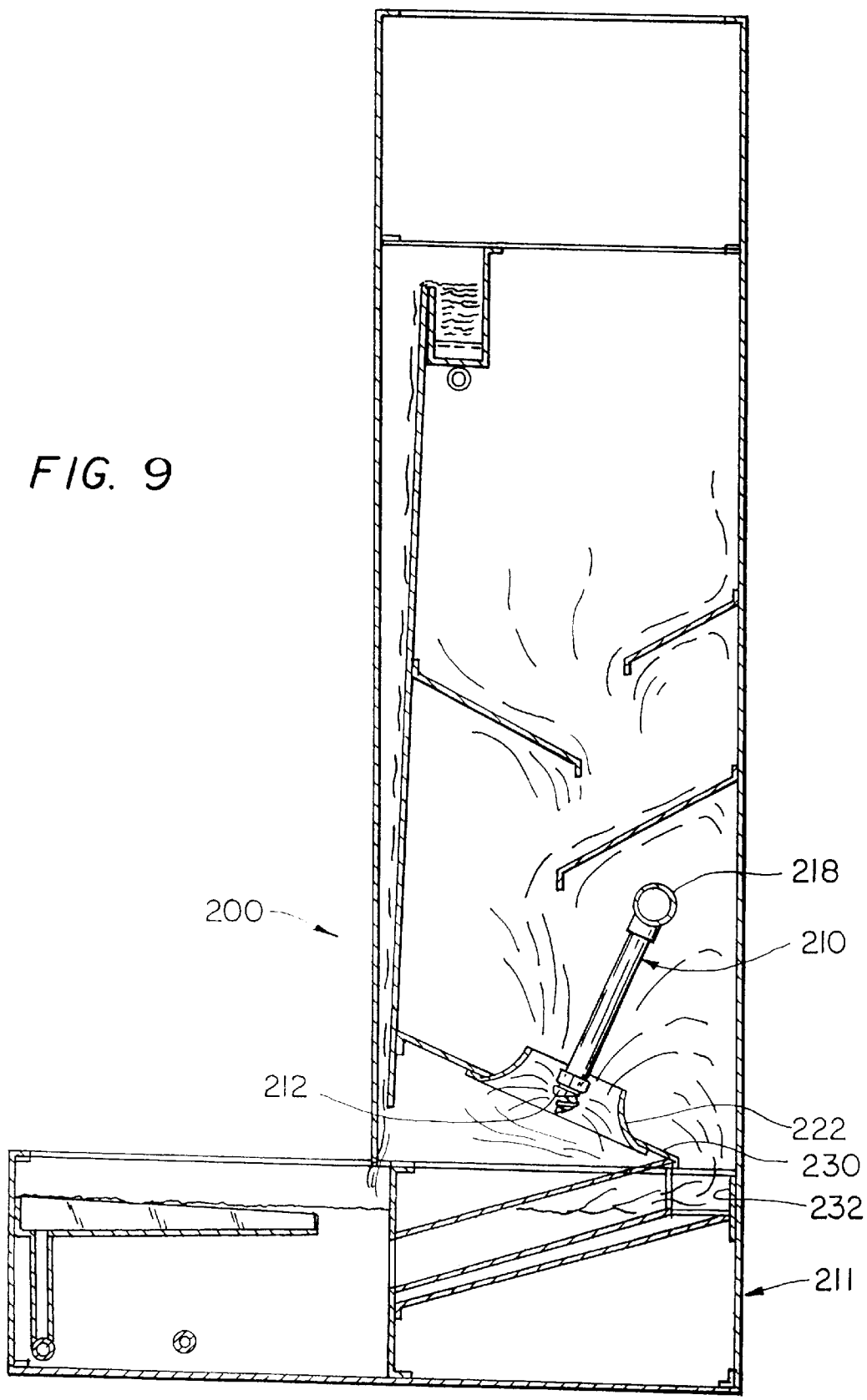
FIG. 9 is a view similar to FIG. 2, but of the second embodiment shown in FIG. 8.
Figure 10:
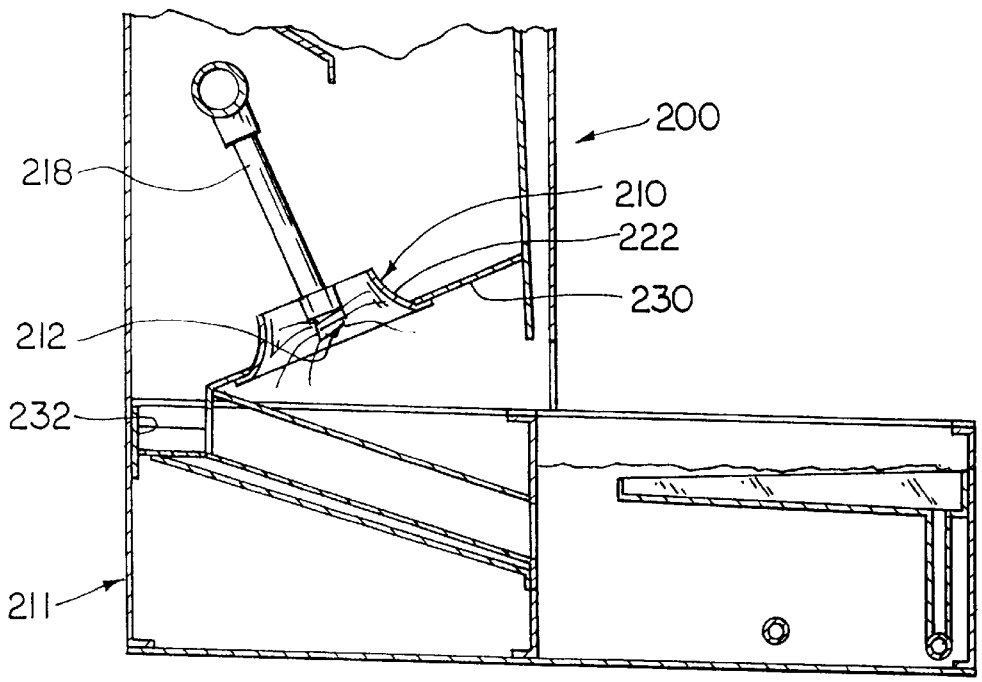
FIG. 10 is a view similar to FIG. 5, but of the second embodiment shown in FIG. 8.
Figure 11:
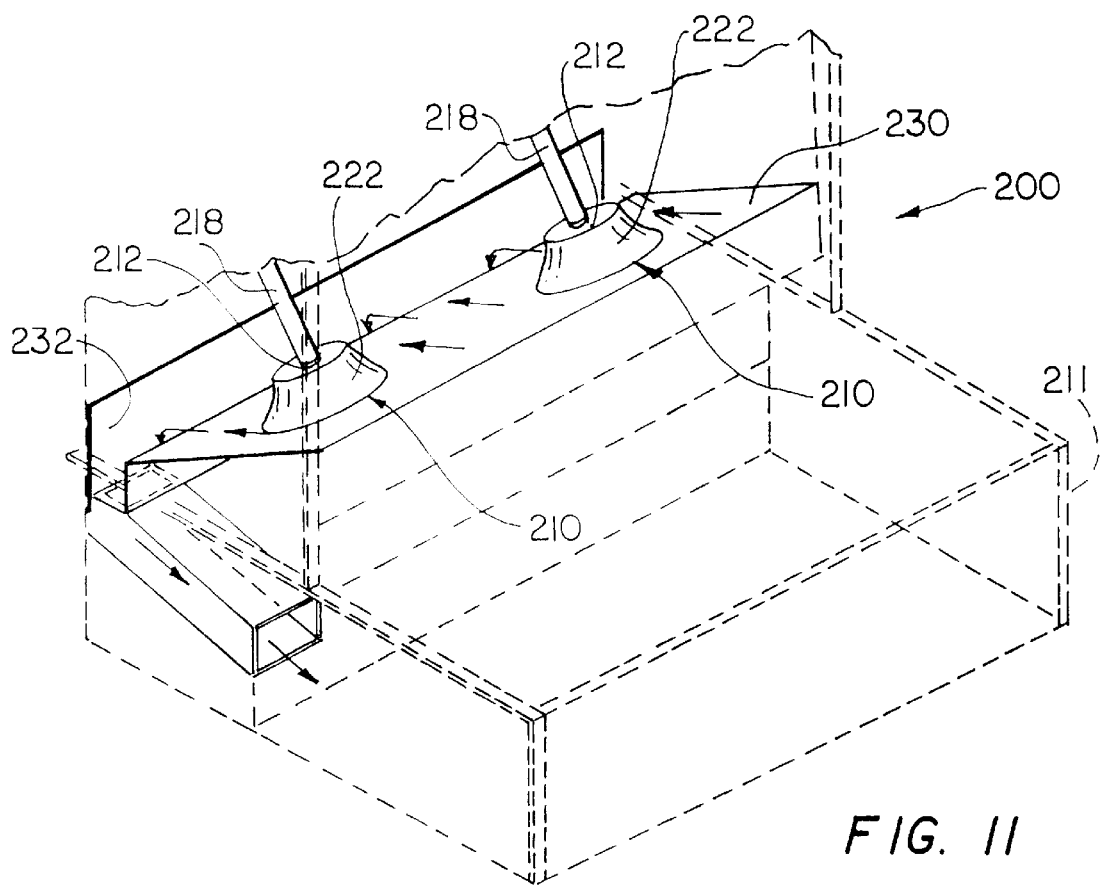
FIG. 11 is a view similar to FIG. 6, but of the second embodiment shown in FIG. 8.
Figure 12:
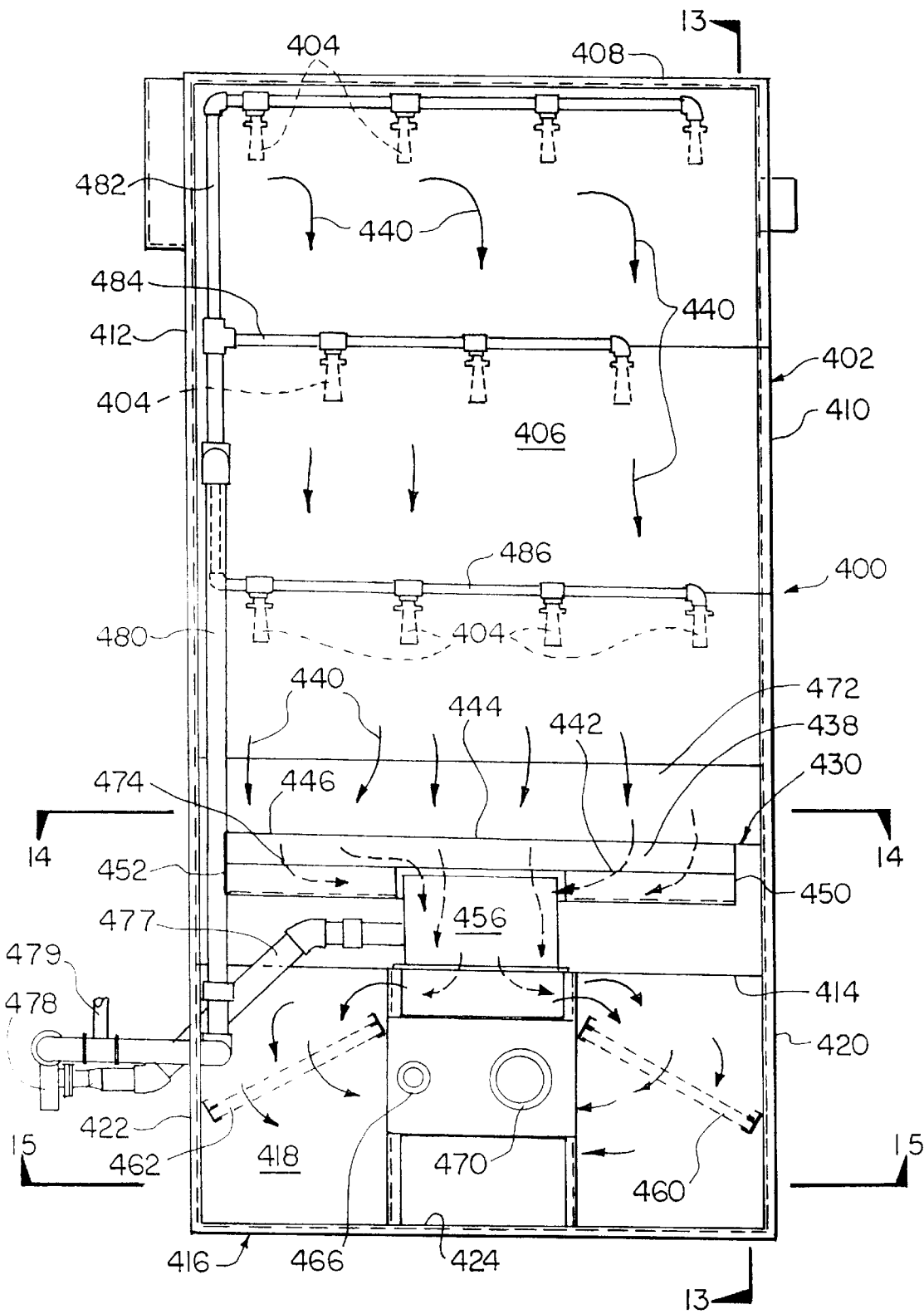
FIG. 12 is a top view of a tank or pan for use with a paint spray booth like that shown in FIGS. 1–11 or other type booths.
Figure 13:
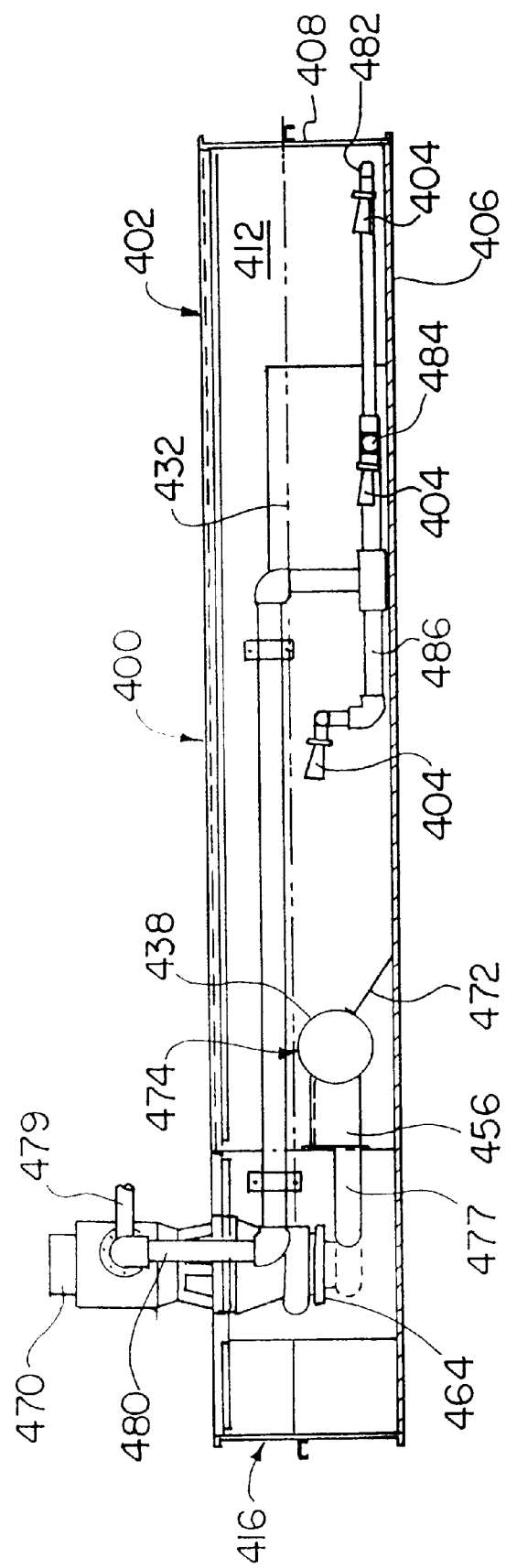
FIG. 13 is a longitudinal sectional view of the tank shown in FIG. 12 taken along the lines 13—13 of FIG. 12.
Figure 14:
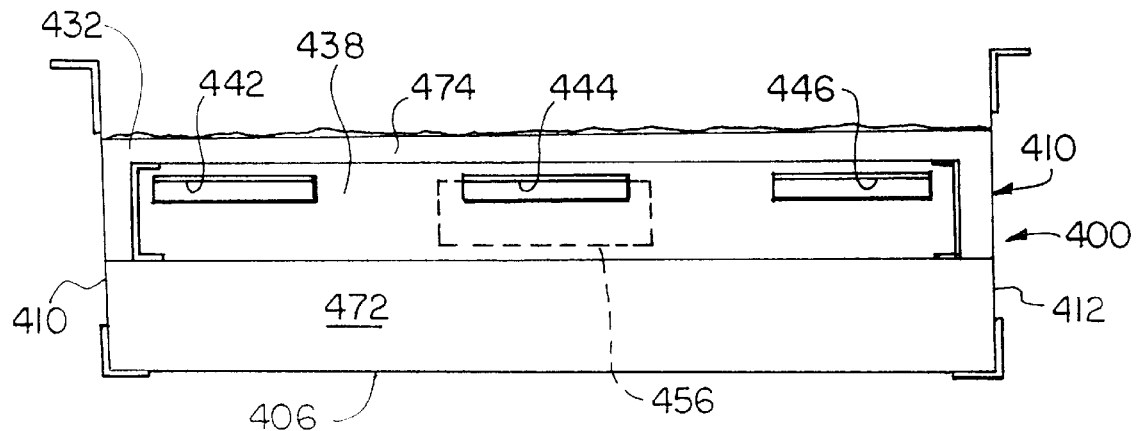
FIG. 14 is a cross sectional view of the tank shown in FIGS. 12 and 13 taken along the lines 14—14 of FIG. 13.
Figure 15:
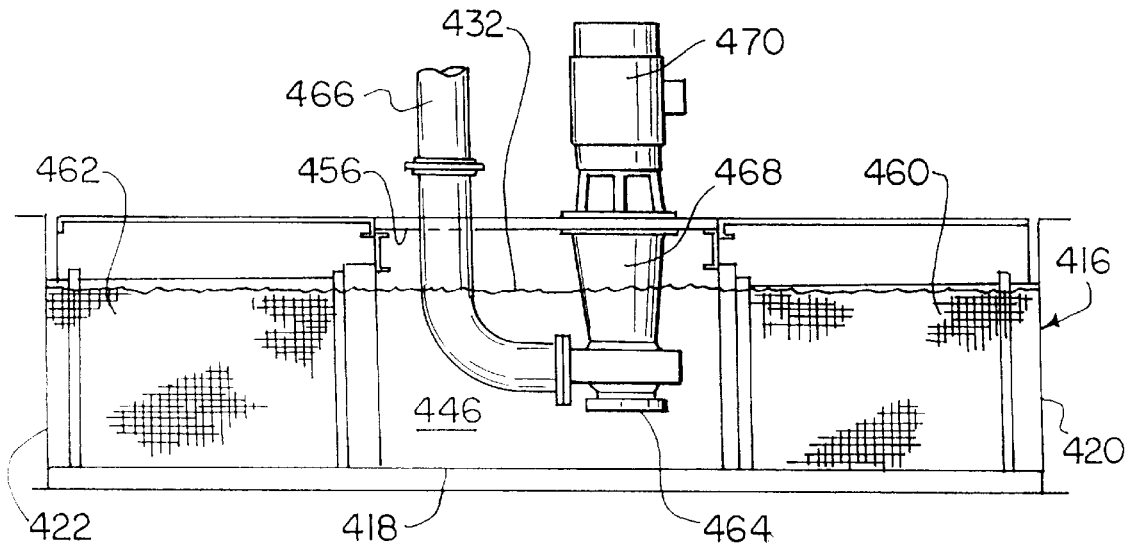
FIG. 15 is a cross sectional view of the tank shown in FIGS. 12 to 14, taken along the lines 15—15 of FIG. 13, showing the pump intake tank or pan and pump-motor for the booth.

While in the first embodiment the washer means or section of booth 10 utilized the air passage 132 and water flow from manifold 96, any other type washer means could have been provided that combines or mixes the air carrying the spent paint material with water flow, such as for example the washer sections sold by Binks under the trademark "Envirotech" which utilizes a venturi and a pressurized water nozzle. The "Envirotech" washer section is described in U.S. Pat. No. 4,239,512 and U.S. Pat. No. 4,399,742 both of which hereby incorporated by reference. A second embodiment of spray booth 200 of the present invention using the Envirotech type washer 210 with a water pan 211 similar to the pan 62 used with the first embodiment is shown in FIGS. 8, 9 and 10. The washer 210 has water nozzles 212 supplied by a water manifold 218 and enclosed by enclosures, in this instance venturi 222. These washers are above a drain sheet 230 and sluice 232. The structure of the washer 210 and its drain sheet 230 are very similar to that shown in FIG. 5 and 6 of the U.S. Pat. Nos. 4,239,512 and 4,399,472. It is believed that this embodiment 200 need not be further described as its structure and operating are obvious to a person skilled in the art from FIGS. 8 to 10 and the written description herein, in the U.S. Pat. Nos. 4,239,512 and 4,399,472, and of the first embodiment shown in FIGS. 1–7.

Turning now to FIGS. 12 to 15, an improved type pan or tank 400 is shown and could be used with the type booths shown in FIGS. 1–11 or other type booths (not shown). The tank 400 is generally rectangular having an input or collection section 402 containing the plurality inducers 404 and formed by a bottom sheet 406, a back end wall 408 and opposed sides 410 and 412 and closed by a bulkhead 414 extending across the tank. Next to the bulkhead 414 is a pump pick up or intake pan or tank 416 from which water is drawn by the booth main pump to provide wash water for the booth manifolds (such as 96 of the FIG. 1 embodiment) and working water sheets or curtains as was previously described. This portion too has a bottom sheet 418, two opposed sides 420 and 422 and a closing end wall 424. Instead of the surface skimmers 170 shown in FIGS. 1, 2, 5, 8, 9 and 10, a spent paint intake pipe or system 430 is provided. In this system, instead of being located on or near (just below) the top surface 432 (liquid level) of the pan or tank, the system 430 is located a distance below the surface, say from 10% to 40% of the distance between the bottom 406 of the tank 400 and top liquid surface 432. For example, if the pan or tank were 20 inches deep the slots would be located from 2 to 8 inches below the liquid surface, with 3 to 4 inches being preferred. The intake system 430 preferably comprises a large diameter pipe 438, say from 4 to 15 inches in diameter (and in the instance of FIGS. 12–15, 12 inches in diameter), which preferably extends generally perpendicular to the flow indicated by arrows 440 in the tank from one end to the other. To let liquid and spent paint into the pipe 438 of system 430, an opening means or series of elongated slots 442, 444 and 446 (FIG. 14) are provided along the pipes' length (booth or tank's width). The criterion used to size the slots is to select them to prevent dead spots in the tank so that there is a generally uniform flow of spent material into the pipe 438 through the slots, and the slots are sized large enough not to become clogged (say ¾ of an inch being the smallest dimension used). Generally, the total area of the slots should be about 2½ times the pipe diameter. That is, for a 10" pipe, the slots would total about 25 sq. inches. In the structure shown in FIGS. 12 to 15, the pipe 438 is of 12 inches in diameter with three slots each roughly 4 inches by 24 inches. While one end of the pipe could be closed and the other end connected to the pump pick up tank, for example, to the pump pick up tank 98 in the embodiment of FIG. 1, in the present embodiment both ends 450 and 452 of pipe 438 are closed as by caps or welding sheets thereover, and the spent paint containing liquid is drawn off a center duct 456 at the back of the pipe 438 which empties into the pump intake or pick up tank 416, formed behind the pipe 438. The duct is sized to give about a 1 ft./sec. velocity and is about 9×30 inches in cross section. The velocity is fastest in the slots, slows somewhat in the pipe and slows further in the duct. While in this instance the pick up tank is behind, it could just have easily be placed at the side as is tank 98. This discharge from the duct 456, passes through either screen 460 or 462 and then to the pump pick up 464 and hence to pipe 466 to be recirculated in the booth (as is indicated by the arrows). As is shown, the pump 468 also includes or is connected to its motor 470.

It is desired that the upper or lower portions above or below the slots 442, 444 and 446 can be baffled to help direct flow into the slots. As is shown in the FIGS. 12 to 14 embodiment a lower baffle 472 is provided and is inclined to "ramp up" the spent material toward the slots. Also, a top baffle 474 is secured to the top of the pipe 438 to prevent overflow into the pump pick up tank 416. While only three slots are shown, there could be more or they could be a single continuous slot generally close to the width of the tank. For that matter, if the flow were in another direction, the pipe could be differently oriented. While it is desirable to have the flow perpendicular into the slots, it is not a necessity, and other reasonable angles of the flow into the slots too could work, say from 30° to 150°. Of course, the closer to perpendicular, the easier it is to make the flow more uniform across the tank width and to keep up the flow velocity in the tank to prevent unwanted accumulation. These slots could be made variable in size or adjustable by a sliding covering member, as is known, to assist in "balancing out" the flow in the tank 400 to prevent "dead spots" and unwanted accumulation.

As is shown, the tank 400 could have flow inducers 404, similar to those previously discussed, to encourage flow of spent material into the slots 442, 444, 446. The inducers 404 would of course be fed excess water from duct 456 and pipe 477 which is then pressurized by the booth's inducer pump 478 to help create a flow in the tank along the lines previously discussed. Using the piping 480, 482, 484 and 486 the pressurized water is then fed to the booth's inducers 404. If desired, the inducers could instead receive a flow from the main pump 468.

The spent material would of course collect and flow into the tank 400, say at the end opposite the pipe 438, be induced along toward the pipe 438 up the baffle ramp 474, then drawn off through the slots, say 442, and out the back side of the pipe 438 into a rear duct portion 456 from which it would be drawn off to either the booth's main pump 468 and/or via pipe 477 to the inducer pump 478 and, via pipe 479, to the separator to remove the spent material or the inducers, as was discussed earlier.

One of the principal advantages of the use of spent paint intake system 430 in the booth's tank, over the skimmer approach, is that the booth is not dependent upon flotation of the spent paint into the skimmer. That advantage is achieved because the submerged pipe 438 with its slots 442, 444, 446 will also draw off heavy, light and neutral buoyancy spent paint material. Also, the large flows keep the entire system clean without manual assistance. For example, a booth with a 2400 gallon tank, might have a main pump of 1200 gpm and an inducer pump of 300 gpm, with a total flow in the tank of 1500 gpm from one end to the other, with all 1500 gpm going into the spent paint pipe intake 438, 1200 gpm going into the pipe's water manifolds (like 96) by keeping the upper portions of the booth clean, 270 gpm going to the inducers in the tank to prevent accumulation, and 30 gpm going to the separator to remove spent paint material.

While in the FIG. 1 embodiment a sluice 90 was provided for the rear of the booth, a second channel or sluice could be provided at the front of the booth to collect and direct the water flow off of the water curtain, if desired.

While in the preferred embodiments the spent paint material was conveniently collected in the accessible front of the booth, it could have just as easily been collected in another portion, such as an easily accessible deep tank portion, provided at the rear or side of the booth.

While the preferred embodiments disclose a paint spray booth of new construction, the present invention lends itself to and can be incorporated into a kit to update existing booths. Such existing booths, if updated to include the elements called for in the appended claims would, of course, be covered by such claims.

Such tall booths as 50 feet or more could be provided by stacking several water curtains and attaching gutters or sluices below every 8 to 10 feet of height with a single pan at the bottom. And for wide booths they could be assembled by several upper booth structures say 10 to 20 feet in length to give the desired width with one or more pan structures beneath them.

While the preferred embodiments of improved paint spray booth of the present invention have been illustrated and described, from the foregoing it should be understood that variations, modifications and equivalent structures thereof fall within the scope of the appended claims.

What is claimed is:

1. A paint spray booth for painting an article and separating spent paint material from air and water used in the paint spray booth to collect and separate the spent paint comprising: a water supply in said booth for providing water flow in said booth, air washer means for washing the air of spent paint material, said washer means receiving water from said water supply, said air washer means including at least one water nozzle spraying water into the air to capture the spent material, said washer means further comprising a venturi member surrounding the water nozzle, an eliminator means rearwardly adjacent to said washer means for removing water from the air discharged from said booth, a sheet metal drain section beneath said washer means and said eliminator means, said drain section being of a shallow depth for water run off from said washer means and said eliminator means, a sheetmetal deep pan section adjacent said drain section with at least a part of said deep pan section in an accessible portion of said booth, said drain section not extending over said deep pan section but only adjacent and higher than the same, water being contained in the bottom of said booth by both said drain section and said deep pan section, and said drain section draining the water it collects into one end of said adjacent deep pan section to cause a water flow therein from one end to the opposite end of said deep pan section, said water supply using water from the opposite end of said deep pan section, the water returning to said deep pan section from said drain section creating a directional water flow in said deep pan section from one end thereof to the other end thereof sufficient in velocity to move said spent paint material and prevented spent paint material from accumulating in said deep pan section.

2. A paint spray booth as in claim 1, wherein said washer means mixes the air carrying spent paint material with water from said deep pan section to clear the spent paint material from the air.

3. A paint spray booth as in claim 1, wherein a plurality of said water nozzles are provided.

4. A paint spray booth as in claim 1, wherein said water nozzle forms one or more sheets of water spray to clear the spent paint material from the air.

5. A paint spray booth as in claim 1, further comprising a sluice adjacent said drain section, said drain section draining into said sluice.

6. A paint spray booth as in claim 5, further comprising a duct, said sluice draining into said duct and said duct connecting to said deep pan section.

7. A paint spray booth as in claim 1, further comprising skimmer means in said booth for skimming off any floating spent paint material.

8. A paint spray booth as in claim 7, wherein said skimmer means is said deep pan section.

9. A paint spray booth as in claim 7, wherein said skimmer means comprises a basin on top of said deep pan section and a connecting drain in said basin exiting from said deep pan section.

10. A paint spray booth as in claim 1, further comprising separation means including a separator pump and mechanical separator which are connected to take water with spent paint material therein from said deep pan section and to return cleaned water from which spent paint material has been removed to said deep pan section.

11. A paint spray booth as in claim 1, further comprising at least one of the following: a skimmer and a separator and separator pump.

12. A paint spray booth as in claim 11, comprising all items called for in claim 11.

13. A paint spray booth for painting an article and separating spent paint material from air and water used in the paint spray booth to collect and separate the spent paint comprising, a water supply in said booth for providing water flow in said booth, air washer means for washing the air of spent paint material, said washer means receiving water from said water supply, an eliminator means rearwardly adjacent to said washer means for removing water from the air discharged from said booth, a sheetmetal drain section beneath said washer means and said eliminator means, said drain section being of a shallow depth for water run off from said washer means and said eliminator means, a sheet-metal deep pan section adjacent said drain section with at least a part of said deep pan section in an accessible portion of said booth, said drain section not extending over said deep pan section but only adjacent and higher than the same, water being contained in the bottom of said booth by both said drain section and said deep pan section, and said drain section draining the water it collects into one end of said adjacent deep pan section to cause a water flow therein from one end to the opposite end of said deep pan section, said water supply using water from the opposite end of said deep pan section to supply said washer means, said water returning to said deep pan section from said drain section creating a directional water flow in said deep pan section from one end thereof to the other end thereof sufficient in velocity to move said spent paint material and prevented spent paint material from accumulating in said deep pan section, further comprising a plurality of water outlets in said washer means for washing the air of spent paint material, said water outlets being arranged in two rows, and said rows are staggered with respect to each other along the length of said rows.

14. A paint spray booth for painting an article and separating spent paint material from air and water used in the paint spray booth to collect and separate the spent paint comprising, a water supply in said booth for providing water flow in said booth, air washer means for washing the air of spent paint material, said washer means receiving water from said water supply, an eliminator means rearwardly adjacent to said washer means for removing water from the air discharged from said booth, a sheetmetal drain section beneath said washer means and said eliminator means, said drain section being of a shallow depth for water run off from said washer means and said eliminator means, a sheetmetal deep pan section adjacent said drain section with at least a part of said deep pan section in an accessible portion of said booth, said drain section not extending over said deep pan section but only adjacent and higher than the same, water being contained in the bottom of said booth by both said drain section and said deep pan section, and said drain section draining the water it collects into one end of said adjacent deep pan section to cause a water flow therein from one end to the opposite end of said deep pan section, said water supply using water from the opposite end of said deep pan section to supply said washer means, said water returning to said deep pan section from said drain section creating a directional water flow in said deep pan section from one end thereof to the other end thereof sufficient in velocity to move said spent paint material and prevented spent paint material from accumulating in said deep pan section, further comprising a water curtain section for said washer means, a water supply manifold at the top of said water curtain section for providing at least a portion of its water to flow down said water curtain section, said water supply manifold having a plurality of spaced apart outlet openings therein arranged in at least two rows, V-shaped cap means extending a spaced distance over each of said rows, said V-shaped cap means being closer at the center of the V than at the ends of the V to said water supply manifold to divert water flow from each row into at least two water spray sheets, one emanating from each of the two edges of each of the V-shaped cap means, air passage means starting at the top of said water curtain section, said air passage means being spaced from and turning around and carrying down to the bottom and backside of said water curtain section, an eliminator section adjacent said air passage means, said air passage means at the bottom of the backside of said water curtain section connecting with said eliminator section for flow from the bottom of said eliminator section up to the top thereof, a drain sheet located above the ground beneath said backside of said water curtain and said eliminator section, the drain sheet beneath said eliminator section and said backside of said water curtain being shallow in depth sufficient to permit water to run off, a deep pan section located above the ground with at least a part thereof in an accessible portion of said booth, said drain sheet draining into said deep pan section, separation means for separating spent paint material from water in said deep pan section, pump means for supplying water from said deep pan section to said water curtain section, whereby the spent paint materials generated in spray painting can be recovered from the air discharged from said booth and the water used in said water curtain section, air passage means, eliminator section, and said deep pan section without adverse accumulation and effecting the booth's operation.

15. A paint spray booth as in claim 14, wherein said manifold is connected to continuously supply water to said outlets and excess water in said manifold, not discharged out said outlets is returned to said deep pan section to cause a directed flow therein.

16. A paint spray booth as in claim 15, wherein said manifold discharges water to flow inducers in said deep pan section to create additional water flow therein.

17. A paint spray booth as in claim 15, wherein said discharge from said manifold causes a flow from one end to the other of said deep pan section.

18. An above the ground paint spray booth for painting an article and separating spent paint material from air and water used in the paint spray booth, comprising a water supply manifold for providing water flow in said booth, air washer means using water flow for washing the air of spent paint material, said washer means receiving water from said water supply manifold, an eliminator section rearwardly adjacent to said washer means, a sheetmetal drain section located above the ground and beneath said washer means and said eliminator section being of a shallow depth for water run off, a deep pan section with at least a part thereof in an accessible portion of said booth, said sheetmetal drain section draining the water it collects into one end of the deep pan section to cause flow therein from one end to the other and, said water supply manifold receiving water at one portion thereof from said deep pan section to supply said washer means and any excess water not supplied to said washer means being returned to create additional directional flow in said deep pan section from one end thereof to the other end thereof sufficient to prevent accumulation of spent paint material in said deep pan section and to continuously purge said manifold, duct means for said booth for taking off spent paint material and water from the deep pan section, and a separator and a pump for said separator, said pump and separator being in fluid connection to the booth for taking water from said booth, cleaning the same of spent paint material and returning the water to the booth.

19. A paint spray booth as in claim 18, wherein said washer means comprises at least one water nozzle supplied with water from said water supply manifold to provide at least one sheet of water for washing the spent paint material from the air.

20. A paint spray booth as in claim 18, wherein a plurality of water nozzles is provided.

21. A paint spray booth as in claim 18, wherein said air washer further comprises a round venturi like member surrounding the water nozzle.

22. A paint spray booth as in claim 18, further comprising a supply pump for said water supply, said duct means for taking off spent paint material comprising a spent paint intake system for receiving the water and spent paint material from said pan section, said spent paint intake system discharging water to said supply pump to be recirculated to said booth and being located below the surface of the water in said pan section, some of said water from said spent paint intake system being recirculated to said washer means, some of said water from said spent paint intake system being recirculated in said pan to cause a flow therein toward said spent paint intake system, and some of said water from said spent paint intake system being processed to remove spent paint material from said booth.

23. A paint spray booth as in claim 22, wherein said spent paint intake system includes a duct having opening means for receiving said water from said pan section.

24. A paint spray booth as in claim 23, wherein said duct comprises a pipe means located below the surface of the water in said pan, having one or more openings therein.

25. A paint spray booth as in claim 23, wherein said opening means are adjustable in size to permit balancing of flow from said pan section.

26. A paint spray booth for painting an article and separating spent paint material from air and water used in the paint spray booth to collect and separate the spent paint, a water supply in said booth for providing water flow in said booth, a pump for said water supply, washer means for washing the air of spent paint material, said washer means receiving water from said water supply, an eliminator means rearwardly adjacent to said washer means for removing water from the air discharged from said booth, a drain section beneath said washer means and said eliminator means, said drain section permitting water run off from said washer means and said eliminator means, a pan section with at least a part thereof in an accessible portion of said booth, and said drain section draining the water it collects into said pan section, said water supply using water from said pan section to supply said washer means, said water returning to said pan section from said drain section creating a water flow in said pan section sufficient in velocity to move said spent paint material and prevent accumulation of spent paint material in said pan section, a spent paint intake system for receiving all the water and spent paint material from said pan section, said spent paint intake system discharging water to said pump to be recirculated to said booth and being located below the surface of the water in said pan section.

27. A paint spray booth as in claim 26, wherein said spent paint intake system includes a duct means having opening means for receiving said water from said pan section.

28. A paint spray booth as in claim 27, wherein said duct means comprises pipe means, having openings therein.

29. A paint spray booth as in claim 27, wherein said duct means comprises a pipe with one or more slots therein.

30. A paint spray booth as in claim 27, wherein said opening means are adjustable in size to permit balancing of flow from said pan section.

31. A paint spray booth as in claim 27, further comprising a pipe extending generally perpendicular to the flow in said pan section, said pipe being located in said pan section at an end opposite where the flow enters said pan section, said pipe having one or more slots therein located below the surface of the water in said pan section.

* * * * *